United States Patent [19]

King

[11] 3,824,589

[45] July 16, 1974

[54] COMPLEMENTARY OFFSET BINARY CONVERTER

[75] Inventor: James G. King, Owego, N.Y.

[73] Assignee: International Business Machines Corporation, Armonk, N.Y.

[22] Filed: Dec. 26, 1972

[21] Appl. No.: 317,990

[52] U.S. Cl. .......... 340/347 DD, 235/164

[51] Int. Cl. .......... G06f 3/00

[58] Field of Search ...... 235/154, 155, 92 CM, 169, 235/174, 164; 340/347 DD

[56] References Cited

UNITED STATES PATENTS

| | | | |
|---|---|---|---|
| 2,798,667 | 7/1957 | Spielberg et al. | 235/154 X |
| 2,799,450 | 7/1957 | Johnson | 235/169 |
| 2,856,597 | 10/1958 | De Motte | 340/347 DD |
| 2,920,820 | 1/1960 | Goldberg et al. | 235/169 X |
| 2,941,719 | 6/1960 | Gloess et al. | 235/164 |
| 2,972,137 | 2/1961 | Dunn | 340/347 DD |
| 3,034,719 | 5/1962 | Anfenger et al. | 235/154 |
| 3,207,888 | 9/1965 | Broce | 235/174 |
| 3,576,973 | 5/1971 | Draper | 235/92 CM |
| 3,610,903 | 10/1971 | Stokes et al. | 235/154 |

OTHER PUBLICATIONS

TTL Integrated Circuits Catalog Supplement From Texas Instruments Inc. 15 March, 1970, pg. 57-1-5-7-11.

*Primary Examiner*—Charles D. Miller

*Attorney, Agent, or Firm*—Norman R. Bardales

[57] ABSTRACT

A converter and control means therefor for converting sign magnitude, one's complement and two's complement binary input signals to complementary offset binary output signals.

3 Claims, 9 Drawing Figures

| | | SWITCH CONTACTS | | | | PINS | | | | INPUT DATA TERMINALS | | | | | | | | | OUTPUT DATA TERMINALS | | | | | | | | FUNCTION |
|---|---|---|---|---|---|---|---|---|---|---|---|---|---|---|---|---|---|---|---|---|---|---|---|---|---|---|---|
| BIN. FORM | DEC NO. | 14a | 14b | 17a | 17b | S2 | S3 | $\overline{CN}$ (10A) | CN (10B) | 10-7 (B7) | 10-6 (B6) | 10-5 (B5) | 10-4 (B4) | 10-3 (B3) | 10-2 (B2) | 10-1 (B1) | 10-0 (B0) | PIN (F7) | 10-6' (F6) | 10-5' (F5) | 10-4' (F4) | 10-3' (F3) | 10-2' (F2) | 10-1' (F1) | 10-0' (F0) | 10-7' | |
| SM | +1 | C | – | C | – | 1 | 0 | 0 | 0 | 0 | 0 | 0 | 0 | 0 | 0 | 0 | 1 | 1 | 1 | 1 | 1 | 1 | 1 | 1 | 0 | 0 | $\overline{B}$ |
| | +0 | C | – | C | – | 1 | 0 | 0 | 0 | 0 | 0 | 0 | 0 | 0 | 0 | 0 | 0 | 1 | 1 | 1 | 1 | 1 | 1 | 1 | 1 | 0 | $\overline{B}$ |
| | -0 | C | – | C | – | 0 | 1 | 1 | 1 | 1 | 0 | 0 | 0 | 0 | 0 | 0 | 0 | 0 | 1 | 1 | 1 | 1 | 1 | 1 | 1 | 0 | B MINUS 1 |
| | -1 | C | – | C | – | 0 | 1 | 1 | 0 | 1 | 0 | 0 | 0 | 0 | 0 | 0 | 1 | 1 | 0 | 0 | 0 | 0 | 0 | 0 | 0 | 1 | B MINUS 1 |
| 1'sC | +1 | – | C | C | – | 1 | 0 | 0 | 0 | 0 | 0 | 0 | 0 | 0 | 0 | 0 | 1 | 1 | 1 | 1 | 1 | 1 | 1 | 1 | 0 | 0 | $\overline{B}$ |
| | +0 | – | C | C | – | 1 | 0 | 0 | 0 | 0 | 0 | 0 | 0 | 0 | 0 | 0 | 0 | 1 | 1 | 1 | 1 | 1 | 1 | 1 | 1 | 0 | $\overline{B}$ |
| | -0 | – | C | C | – | 1 | 0 | 1 | 1 | 1 | 1 | 1 | 1 | 1 | 1 | 1 | 1 | 1 | 1 | 1 | 1 | 1 | 1 | 1 | 1 | 0 | $\overline{B}$ MINUS 1 |
| | -1 | – | C | C | – | 1 | 0 | 1 | 0 | 1 | 1 | 1 | 1 | 1 | 1 | 1 | 0 | 0 | 0 | 0 | 0 | 0 | 0 | 0 | 0 | 1 | $\overline{B}$ MINUS 1 |
| 2'sC | +1 | – | C | – | C | 1 | 0 | 0 | 0 | 0 | 0 | 0 | 0 | 0 | 0 | 0 | 1 | 1 | 1 | 1 | 1 | 1 | 1 | 1 | 0 | 0 | $\overline{B}$ |
| | ±0 | – | C | – | C | 1 | 0 | 0 | 0 | 0 | 0 | 0 | 0 | 0 | 0 | 0 | 0 | 1 | 1 | 1 | 1 | 1 | 1 | 1 | 1 | 0 | $\overline{B}$ |
| | -1 | – | C | – | C | 1 | 0 | 0 | 0 | 1 | 1 | 1 | 1 | 1 | 1 | 1 | 1 | 0 | 0 | 0 | 0 | 0 | 0 | 0 | 0 | 1 | $\overline{B}$ |

FIG. 5

COMPLEMENTARY OFFSET BINARY CONVERTER

The Invention herein described was made in the course of or under a contract or subcontract thereunder, with the Department of the Navy.

BACKGROUND OF THE INVENTION

1. Field of the Invention

This invention relates to binary signal converters and more particularly to complementary off-set binary converters.

2. Description of the Prior Art

As generally understood in the art and as used herein, a decimal number, i.e., its sign and magnitude, may be represented in binary form by assigning the appropriate binary value, i.e., a binary one or zero, to the appropriate binary magnitude positions $2^0$, $2^1$, $2^2$, etc. and the appropriate binary value to the binary sign bit position. By convention, generally a binary zero and a binary one are used to represent positive and negative signs, respectively.

In practice, the magnitude bit positions are generally arranged from left to right in successive decreasing higher orders from the most significant bit position to the least significant bit position, e.g. $2^0$. The sign bit position generally precedes, or alternatively succeeds, the magnitude bits.

By way of example and for sake of explanation, it is assumed that a data word utilizes five binary bit positions to represent a decimal number. It is further assumed that the first bit position is the sign bit and the four succeeding bit positions are the magnitude bits and are arranged in decreasing higher orders $2^3$, $2^2$, $2^1$, and $2^0$, respectively. Positive and negative signs are represented by the customary convention, to wit: a binary zero and one, respectively.

In the example, the positive decimal numbers 3, 2, 1 and 0 are represented in binary form as indicated in Table I below, as follows:

TABLE I

| Decimal | Binary (1'sC, 2'sC, SM) |
|---|---|
| +3 | 00011 |
| +2 | 00010 |
| +1 | 00001 |
| +0 | 00000 |

For a positive decimal number, its sign magnitude, ones complement, and two's complement forms are identical to its binary form. For sake of brevity, the terms sign magnitude, one's complement and two's complement, are indicated parenthetically in Table I and elsewhere hereinafter by the designations SM, 1'sC, and 2'sC, respectively.

The sign magnitude binary representation of a negative decimal number is obtained by simply complementing the sign bit, i.e., changing the binary zero to a binary one, of the binary representation of the corresponding positive decimal number. For the given example, the negative decimal numbers −0, −1, −2, −3 are represented in sign magnitude form by complementing the sign bits of their corresponding positive binary counterparts of Table I, and the results of which are tabulated in Table II below, as follows:

TABLE II

| Decimal | Binary (SM) |
|---|---|
| −0 | 10000 |
| −1 | 10001 |
| −2 | 10010 |
| −3 | 10011 |

The one's complement binary representation of a negative decimal number is obtained by complementing, i.e., changing the binary zero's to a binary one and vice versa, all the bits, that is, both sign and magnitude bits, of the binary representation of the corresponding positive decimal number. For the given example, the negative decimal numbers −0, −1, −2, −3 are represented in one's complement form by complementing all the bits of their corresponding positive binary counterparts of Table I and the results of which are tabulated in Table III below, as follows:

TABLE III

| Decimal | Binary (1'sC) |
|---|---|
| −0 | 11111 |
| −1 | 11110 |
| −2 | 11101 |
| −3 | 11100 |

The two's complement binary representation of a negative decimal number is obtained by adding a binary one to the one's complement form of the particular negative decimal number. For the given example, the negative decimal numbers −0, −1, −2, −3 are represented in two's complement form by adding a binary one to their counterpart one's complements of Table III and the results of which are tabulated in Table IV below, as follows:

TABLE IV

| Decimal | Binary (2'sC) |
|---|---|
| −0 | 00000 |
| −1 | 11111 |
| −2 | 11110 |
| −3 | 11101 |

The complementary offset binary representations, hereinafter sometimes referred to as COSB, of positive and negative decimal numbers are obtained by complementing the magnitude bits of their corresponding two's complement representation. For the given example, the decimal numbers +3, +2, +1, ±0, −1, −2, −3 are represented in complementary offset binary form by complementing the magnitude bits of their counterpart two's complements of Tables I and IV and the results of which are tabulated in Table V below, as follows:

TABLE V

| Decimal | Binary (COSB) |
|---|---|
| +3 | 01100 |
| +2 | 01101 |

TABLE V-Continued

| Decimal | Binary (COSB) |
|---|---|
| +1 | 01110 |
| ±0 | 01111 |
| −1 | 10000 |
| −2 | 10001 |
| −3 | 10010 |

Code converters of the prior art are known which provide code conversion of one form into another form. Generally, binary code converters convert data signals of one binary code form into another binary code form, and their complexity and cost are increased when conversion requires converting signals having plural different binary code forms into another different single predetermined binary code form.

SUMMARY OF THE INVENTION

It is an object of this invention to provide a converter which converts binary input signals of the sign magnitude, one's complement and two's complement types to complementary offset binary output signals.

It is another object of this invention to provide an aforementioned converter which processes the three input signal types by substantially common circuitry.

It is still another object of this invention to provide an aforementioned converter which is simple and inexpensive.

According to one aspect of the present invention, circuit apparatus is provided which comprises a converter means for converting binary data signals of three types, to wit: sign magnitude, one's complement and two's complement forms, and a control means for providing control signals for the converter means. The converter means in response to the binary data signals and the control signals converts the binary data signals into complementary offset binary form.

The foregoing and other objects, features and advantages of the invention will be apparent from the following more particular description of the preferred embodiment of the invention, as illustrated in the accompanying drawing.

BRIEF DESCRIPTION OF THE DRAWING

FIG. 5 is a truth table for the signal converter of FIG. 1; and

In the figures, like elements are designated with similar reference numerals.

DESCRIPTION OF THE PREFERRED EMBODIMENT

Figure 1:
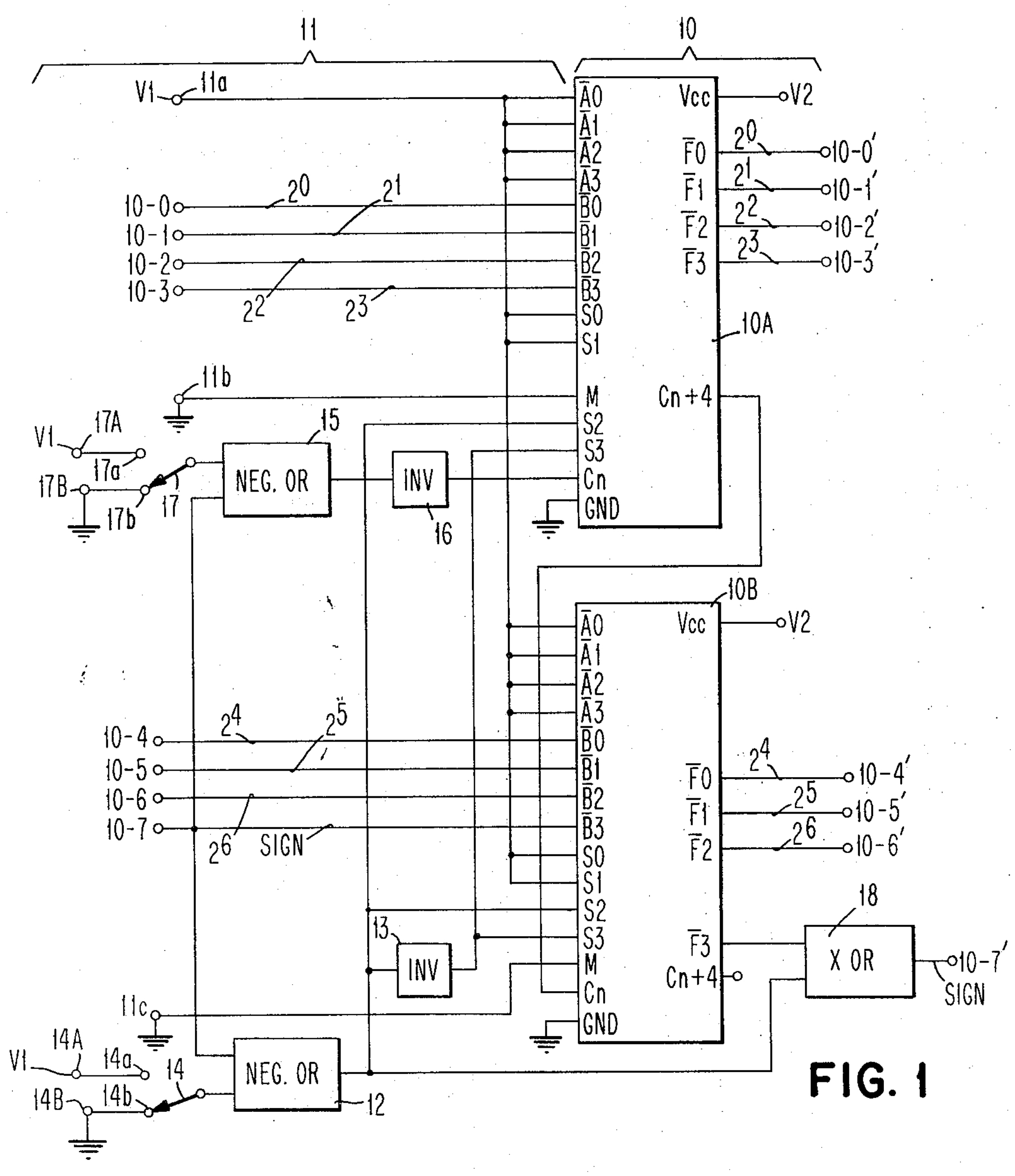
FIG. 1 is a schematic view in block form of a preferred embodiment of the present invention.

In accordance with the principles of my invention, the signal converter of my invention comprises arithmetic logic unit circuit means which provides the following three functions, to wit:

$$F = A\bar{B} \text{ minus } 1, \quad (1)$$

$$F = A\bar{B}, \quad (2)$$

and $$F = AB \text{ minus } 1, \quad (3)$$

where A and B represent two variable binary word inputs and F their resultant output. It should be noted that equations (1) and (3) are mixed functions of Boolean and arithmetic operations, and equation (2) is a Boolean expression.

A commercially available arithmetic logic unit capable of performing these functions and satisfactory for use with the present invention is referred to by the manufacturer as an SN74181 type. The SN74181 is an integrated circuit and performs inter alia these three binary arithmetic operations on two 4-bit words. For a more detailed description of the SN74181 reference may be made to the publication entitled "TTL Integrated Circuits Catalog Supplement from Texas Instruments," March 15, 1970, Texas Instruments, Inc., pages S7-1 to S7-11.

Referring now to FIG. 1, there is shown the preferred embodiment of the signal converter of my invention. It comprises arithmetic logic unit circuit means generally indicated by the reference numeral 10 which provides the aforementioned three functions of equations (1) to (3).

For sake of explanation, circuit means 10 is implemented with two identical arithmetic logic units 10A, 10B, each of which is of the aforementioned SN74181 type. For sake of clarity, the electrode pin reference character designations used for the pins of units 10A, 10B of FIG. 1 are the same as those used in the aforementioned publication. Accordingly, the A and B word input pins are designated $\bar{A}0$, $\bar{A}1$, $\bar{A}2$, $\bar{A}3$ and $\bar{B}0$, $\bar{B}1$, $\bar{B}2$, $\bar{B}3$, respectively; the function output pins are designated $\bar{F}0$, $\bar{F}1$, $\bar{F}2$, $\bar{F}3$, the carry input and output carry pins are designated Cn and Cn+4, respectively; the mode control input pin is designated M; the function-select input pins are designated S0, S1, S2, S3, and the supply voltage and ground pins are designated Vcc and GND, respectively. Other pins referred to as the comparator output, carry propagate output and the carry generate output in the aforementioned publication and designated therein as A = B, $\bar{P}$, and $\bar{G}$, respectively, are not used in the implementation of the present invention and, hence, omitted in FIG. 1 for sake of clarity.

In the example, units 10A and 10B are interconnected to process eight bit words. More specifically, unit 10A processes the four low order magnitude bits $2^0$, $2^1$, $2^2$, $2^3$, and unit 10B also processes four bits, to wit: the next three succeeding higher order magnitude bits $2^4$, $2^5$, $2^6$ and the sign bit. Accordingly, the carry out pin $Cn + 4$ of unit 10A is connected to the carry in pin $Cn$ of unit 10B.

For sake of explanation, the embodiment of FIG. 1 uses positive logic, that is to say, a binary one is an up or high level and binary zero is a down or low level. Under these conditions, the arithmetic logic unit circuit 10 operates in a mode referred to as high levels active.

The control circuitry for circuit 10 is generally indicated by the reference numeral 11. In accordance with the principles of my invention, the A word data input is fixed. Accordingly, the input pins A0 to A3 of the A word input terminals of units 10A and 10B are connected to a common terminal 11*a*. For the given high levels active mode, terminal 11*a* is connected to the high level voltage supply, not shown, which provides the voltage level V1 thereat. Also, the function select control pins S0 and S1 of units 10A, 10B are also at the fixed voltage level V1 and are also connected to the common terminal 11*a*. In addition, the mode pins M of units 10A, 10B for the given mode are in the down level represented schematically by the connections to the grounded terminals 11*b*, 11*c*.

The control circuitry 11 also includes logic for operating the function or select control pins S2 and S3 in a complementary manner. This logic includes by way of example a negative-or gate 12 and inverter 13. Gate 12 negative-ors the data signal sign bit at terminal 10–7 associated with word B, which is present at data input terminals 10–1 to 10–7, and one of two possible fixed signal levels, to wit: the aforementioned up and down levels V1 and ground, respectively. For this purpose the other input of gate 12 is connected to a schematically shown switch 14. Its switch contacts 14*a* and 14*b* are connected to terminals 14A and 14B, respectively, to which are applied the aforementioned levels V1 and ground, respectively. The output of gate 12 is connected to the control pins S2 of units 10A and 10B and also to the input of inverter 13. In turn, the output of inverter 13 is connected to control pins S3 of units 10A and 10B.

With the arm of switch 14 closed on contact 14*a*, the signal level at pins S3 follow the signal level of the sign bit of word B, and the signal level at pins S2 follow the complement of the signal level of the last mentioned sign bit. With the arm of switch 14 closed on contact 14*b*, the signal level at pins S3 are forced to the low level, and the signal level at pins S2 are forced to the complement of the low level and, hence, to an up level.

Control circuitry 11 also includes additional logic for operating the carry input pin *Cn* of unit 10A. This last mentioned logic by way of example includes serially connected negative-or gate 15 and inverter 16. Gate 15 has one input connected to input terminal 10–7 and its other input to the armature of schematically-shown switch 17. The output of inverter 16 is connected to the carry in pin *Cn* of unit 10A. With the arm of switch 17 closed on its contact 17*a*, which is connected to terminal 17A, an up level V1 is negative-ored with the sign bit of word B. As a result, the control signal level at pin *Cn* of unit 10A follows the signal level of the last mentioned sign bit. With the arm of switch 17 closed on its other contact 17*b*, the signal level at pin *Cn* of unit 10A is forced to the low level.

For sake of simplicity, the B word data input terminals are designated by the reference characters 10–0 to 10–7. Terminals 10–0 to 10–6 are associated with the binary bit magnitude positions $2^0$ to $2^6$, respectively, and terminal 10–7 is associated with the sign bit position of the B data. Terminals 10–0 to 10–3 are connected to pins $\bar{B}$0 to $\bar{B}$3, respectively, of unit 10A. Terminals 10–4 to 10–7 are connected to pins $\bar{B}$0 to $\bar{B}$3, respectively, of unit 10B. The output data terminals 10–0′ to 10–6′ are associated with the binary bit magnitude positions $2^0$ to $2^6$, respectively, and terminal 10–7′ is associated with the bit position of the output data. The magnitude bit terminals 10–0′ to 10–3′ are connected to magnitude output data pins $\bar{F}$0 to $\bar{F}$3, respectively, of unit 10A. The magnitude bit terminals 10–4′ to 10–6′ are connected to magnitude output data pins $\bar{F}$0 to $\bar{F}$2, respectively, of unit 10B. A logic circuit, shown as an exclusive-or gate 18 in FIG. 1, is connected between pin $\bar{F}$3 of unit 10B and the sign bit output terminal 10–7′. Gate 18 exclusive-ors the signal levels present at pin $\bar{F}$3 of unit 10B and output of gate 12.

Before describing the operation of the converter of FIG. 1, the operation of the arithmetic logic unit type SN74181 in a high level active mode will first be described. Using the table entitled "Table Of Arithmetic Operations," and the functional block diagram appearing on pages S7–3 and S7–6, respectively, of the aforementioned publication, it can be readily demonstrated that the functions of equations (1) to (3) above are obtained by applying the low and high signal levels L and H, respectively, to the function select pins S0, S1, S2, S3, mode control pin M and the carry pin *Cn* of the SN74181 type unit as shown in Table VI, below as follows:

TABLE VI

| Terminals | | | | | | Function | Equation |
|---|---|---|---|---|---|---|---|
| M | S0 | S1 | S2 | S3 | Cn | | |
| L | H | H | H | L | H | $F=A\bar{B}-1$ | (1) |
| L | H | H | H | L | L | $F=A\bar{B}$ | (2) |
| L | H | H | L | H | H | $F=AB-1$ | (3) |

Referring now to the converter of FIG. 1, in operation, a fixed, i.e., constant, up level V1 is applied to terminal 11*a* forcing the signal bits positions of word A to an up level. Likewise, control terminals S0 and S1 of units 10A, 10B are forced to the fixed up level V1 which is applied to terminal 11a. Control terminals M of units 10A, 10B are in fixed low levels by virtue of their respective schematically shown ground connection. Under these conditions, the equations (1) to (3) are reduced, as follows:

$$F = A\bar{B} \text{ minus } 1 = \bar{B} \text{ minus } 1 \qquad (4)$$

$$F = A\bar{B} = \bar{B} \qquad (5)$$

$$F = AB \text{ minus } 1 = B \text{ minus } 1 \qquad (6)$$

The input data signal word B, in accordance with the principles of my invention, is in any of the following mutually exclusive three form types; to wit: sign magnitude, one's complement, or two's complement. If the data B is in sign magnitude form, switches 14 and 17 are closed on their respective contacts 14*a*, 17*a*. If the data B is two's complement, switches 14 and 17 are closed on their respective contacts 14*b*, 17*b*. If the data B is one's complement switches 14 and 17 are closed on their respective contacts 14*b*, 17*a*. The selective closure of the switches 14, 17 may be based on a priori knowledge of the form of the input data B being converted, for example, by an appropriate encoder/decoder means, not shown.

When the data words B are negative numbers in one's complement form, circuit 10 performs the function $\overline{B}$ minus 1 of equation (4). When the data words B are negative numbers in sign magnitude form, circuit 10 performs the function B minus 1 of equation (6). When data words B are positive and negative numbers in two's complement form, and when data words B are positive numbers in sign magnitude form and one's complement form, circuit 10 performs the function B of equation (5). These functions in turn in coaction with the exclusive-or gate 18 convert the data words B into their respective complementary offset binary forms as shown by the examples in the truth table of FIG. 5.

In the truth table of FIG. 5, the decimal numbers ±0 and ±1 are represented in each of their binary sign magnitude, one's complement and two's complement forms as they appear at input terminals 10–0 to 10–7 of the converter of FIG. 1 and their resultant binary complementary offset binary forms as they appear at output terminals 10–0′ to 10–7′. The corresponding condition of the signal levels at terminals S2, S3, Cn are also shown in FIG. 5, as well as the condition of the switches 14, 17. In FIG. 5, the reference character C is used to denote that the particular switch is closed with its particular contact under which the reference character C appears. For sake of clarity, in FIG. 5, the high and low levels are designated by the binary symbols 1 and 0, respectively. Also indicated in the table of FIG. 5 are the carry in signal levels *Cn* of unit 10A for the examples and conditions depicted. For sake of clarity, the resultant carry in signal level associated with unit 10B is also shown in the table. The particular function utilized for the examples and conditions shown in the table are also indicated therein. As can readily be seen from the table of FIG. 5, the converter of FIG. 1 converts data signals in sign magnitude, one's complement, and two's complement form to complementing binary offset form. It should be understood that an appropriate bias supply voltage V2 is applied to bias terminals *Vcc* of units 10A, 10B.

Figure 2A:
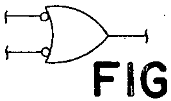
FIGS. 2A and 2B are schematic views of alternative implementations of certain logic blocks of FIG. 1.
Figure 2B:
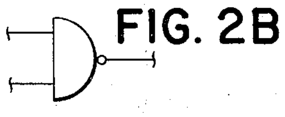
Figure 3A:
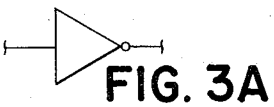
FIGS. 3A and 3B are schematic views of alternative implementations of certain other logic blocks of FIG. 1.
Figure 3B:
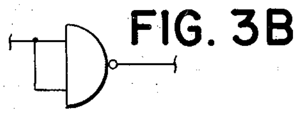
Figure 4A:
FIGS. 4A and 4B are schematic views of alternative implementations of still another logic block of FIG. 1.
Figure 4B:
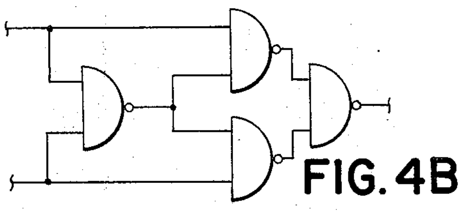

In FIGS. 2A, 3A, 4A are shown the conventional functional logic block diagrams for the negative-or gates 12 and 15, inverters 13 and 16, and the exclusive-or gate 18, respectively. It should be understood that other logic circuits may be employed. For example, the circuitry of FIGS. 2A, 3A, 4A may be replaced by the NAND logic circuits of FIGS. 2B, 3B, 4B, respectively.

As is apparent to those skilled in the art, the circuit of FIG. 1 could operate in a low level active mode by reversing the signal levels and modification of the control circuit 11.

The converter of FIG. 1 can be further modified to decrease or expand the number of bits for the data words it processes. For example, the circuit of FIG. 1 can be modified to include more or less stages of arithmetic logic units to the stages of units 10A, 10B to expand or decrease, respectively, the word bit capacity of the converter.

Figure 6:
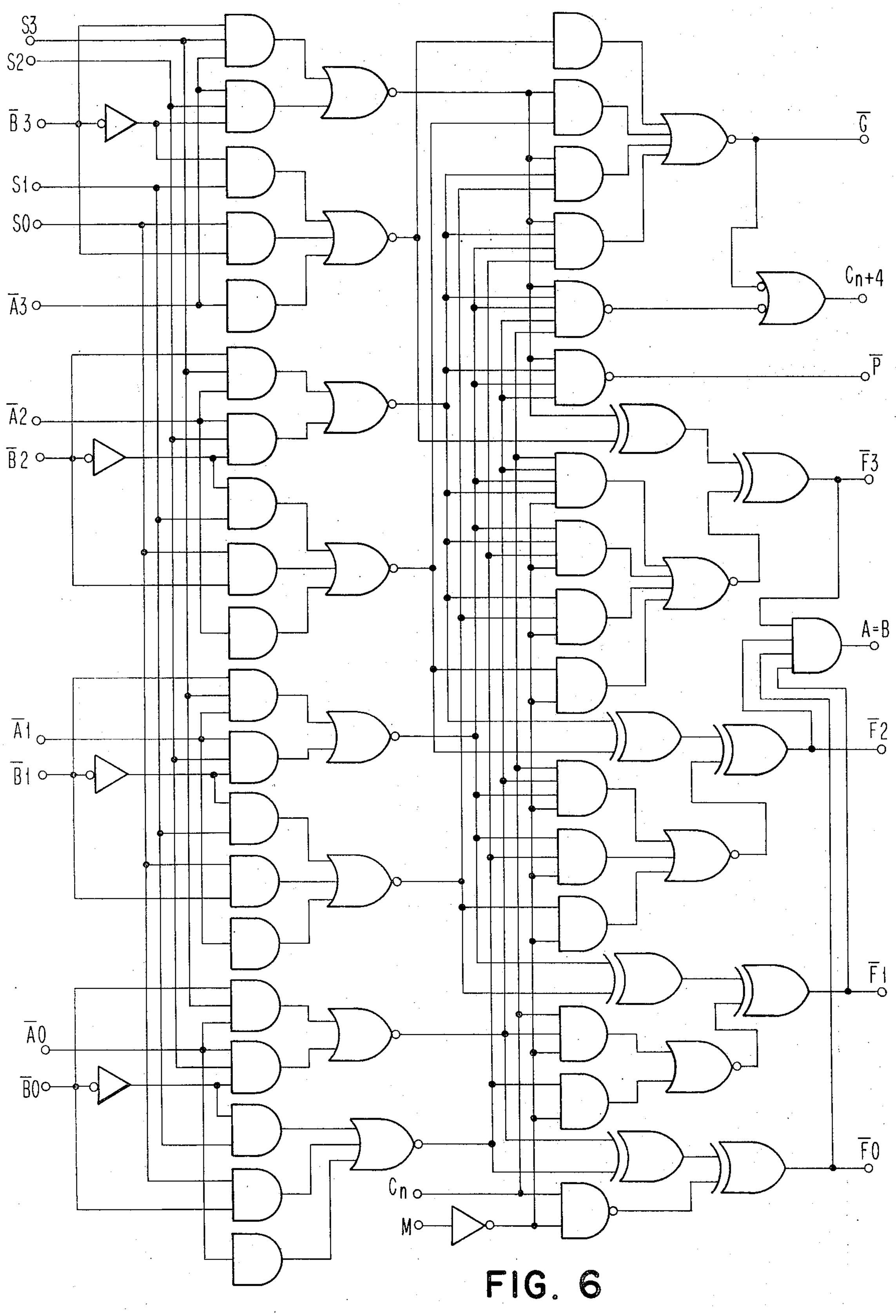
FIG. 6 is a schematic diagram in block form of a commercially available unit suitable for implementing the arithmetic units of FIG. 1.

In FIG. 6 there is shown a functional block diagram of the aforementioned SN74181 which is used to implement the units 10A, 10B. FIG. 6 is substantially identical to the functional block diagram appearing on page S7–6 of the aforementioned Texas Instruments' publication and illustrates the interconnecting circuitry between the aforementioned input terminals S0, S1, S2, S3, $\overline{A}$0, $\overline{A}$1, $\overline{A}$2, $\overline{A}$3, $\overline{B}$0, $\overline{B}$1, $\overline{B}$2, $\overline{B}$3, M, *Cn* and output terminals $\overline{G}$, *Cn* + 4, $\overline{P}$, $\overline{F}$0, $\overline{F}$1, $\overline{F}$2, $\overline{F}$3, A = B. The SN74181 is a high-speed arithmetic logic unit/function generator which has a complexity of 75 equivalent gates on a monolithic chip. For more detailed information, reference may be made to the aforementioned Texas Instruments' publication.

Thus, while the invention has been particularly shown and described with reference to a preferred embodiment thereof, it will be understood by those skilled in the art that various changes in form and details may be made therein without departing from the spirit and scope of the invention.

I claim:

1. Circuit apparatus for converting binary data signals including sign and magnitude bits and being of three types, to wit: sign magnitude, one's complement and two's complement forms, into complementary offset binary form, said apparatus comprising:

arithmetic logic unit means having first and second data word input terminals, data word output terminals, and at least two predetermined first and second control terminals, said first data word input terminals having a predetermined fixed binary first control signal applied thereto and said second data word input terminals having said binary data signals to be converted applied thereto, control means for providing binary second and third control signals to said first and second control terminals, respectively, said control means including:

at least first and second input terminals having applied thereto the first and second binary levels, respectively, of a predetermined binary conditioning signal, Or-gate means of a predetermined type having first and second gate inputs and a first gate output, said first gate input having applied thereto the sign bit os the data signal to be converted, first switching mean for selectively connecting said first and second input terminals of said control means to said second gate input, said gate output being coupled to said first control terminal to provide said second binary control signal thereat, and inverter means coupled between said gate output and said second control terminal to provide said third binary control signal thereat, said arithmetic unit means in response to said data signals to be converted and said control signals providing three functions, as follows:

1. F = $\overline{B}$ minus 1 when said binary data signals to be converted represent negative decimal numbers in one's complementary form,

2. F = B minus 1 when said binary data signals to be converted represent negative decimal numbers in sign magnitude form, and

3. F – $\overline{B}$ when said binary data signals to be converted represent:

i. positive decimal numbers in sign magnitude form, ii. positive decimal numbers in one's complement form, iii. positive decimal numbers in two's complement form, and iv. negative decimal numbers in two's complement form, where B is said binary data signal to be converted, and the magnitude bits of said data signal being converted to the magnitude bits of said complementary offset binary form at the corresponding bit position of said output terminals of said arithmetic logic unit means, said second gate input being connected by said switch means to said first input terminal of said control means whenever said binary data signal to be converted is in sign magnitude form and to said second input terminal of said control means whenever said binary data signal to be converted is in one's or two's complement form, and logic means responsive to the sign bit of said data signals to be converted and said second control signal for converting the bit at the sign bit position of said output terminals of said arithmetic logic unit means to the complementary offset binary sign bit.

2. Circuit apparatus according to claim 1 whereas said arithmetic logic unit further comprises first and second stages, said first stage having a first carry-in input terminal and a carry-out output terminal, said second stage having a second carry-in input terminal connected to said carry-out output terminal of said first stage, and wherein said control means further comprises:

third and fourth input terminals having applied thereto said first and second binary levels, respectively, of said conditioning signal, second Or-gate means of a predetermined type having third and signals gate inputs and a second gate output, said third gate input having the sign bit of said data signal to be converted applied thereat, second inverter means coupled between said second gate output and said first carry-in input terminal, and second switch means for selectively connecting said third and fourth input terminals of said control means to said fourth gate input, said fourth gate means being connected by said second switch means to said third input terminal of said control means whenever said binary data signal to be converted is in sign magnitude or one's complement form and to said fourth input terminal of said control means whenever said binary data signal to be converted is in two's complement form.

3. Apparatus for converting sign magnitude, one's complement, or two's complement binary input signals into complementary offset binary output signals, said apparatus comprising:

a pair of two-position switching devices selectably conditionable to selected combinations of positions according to whether the input data signal is in sign magnitude form, one's complement form, or two's complement form, arithmetic logic unit means having first and second word input terminals and predetermined control terminals, said first word input terminals being conditioned by a fixed binary reference signal, said binary input signals being applied to said second word input terminals in the preselected one of the three said forms, and circuit means connected to said switching devices and said predetermined control terminals to condition said arithmetic logic unit means to convert the binary input signals having the particular preselected form to a complementary offset binary signal.

* * * * *